United States Patent
Manushyn et al.

(10) Patent No.: US 11,398,772 B2
(45) Date of Patent: Jul. 26, 2022

(54) CIRCUIT DEVICE FOR REDUCING COMMON-MODE INTERFERENCE OF A POWER CONVERTER

(71) Applicant: Robert Bosch GmbH, Stuttgart (DE)

(72) Inventors: Illia Manushyn, Marbach am Neckar (DE); Guido Albert Rasek, Forchheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/299,478

(22) PCT Filed: Oct. 9, 2019

(86) PCT No.: PCT/EP2019/077314
§ 371 (c)(1),
(2) Date: Jun. 3, 2021

(87) PCT Pub. No.: WO2020/114653
PCT Pub. Date: Jun. 11, 2020

(65) Prior Publication Data
US 2022/0052599 A1    Feb. 17, 2022

(30) Foreign Application Priority Data
Dec. 5, 2018 (DE) ............ 10 2018 221 032.2

(51) Int. Cl.
*H02M 1/12* (2006.01)
*H02M 1/44* (2007.01)
(Continued)

(52) U.S. Cl.
CPC ........... *H02M 1/123* (2021.05); *H02M 1/126* (2013.01); *H02M 1/44* (2013.01); *H02M 7/5387* (2013.01);
(Continued)

(58) Field of Classification Search
CPC ........ H02M 1/123; H02M 1/126; H02M 1/44; H02M 7/5387; B60L 2270/147; B60L 50/60; H02P 27/06
See application file for complete search history.

(56) References Cited

U.S. PATENT DOCUMENTS 10,425,237 B1 * 9/2019 Bhagwat ............... H04L 12/10
11,031,897 B1 * 6/2021 Meyer .................. H02M 1/12
(Continued)

FOREIGN PATENT DOCUMENTS

DE    202009013362 U1    12/2009
DE    102014224267 A1    6/2016
(Continued)

OTHER PUBLICATIONS

Translation of International Search Report for Application No. PCT/EP2019/077314 dated Jan. 23, 2020 (2 pages).

*Primary Examiner* — Adi Amrany
*Assistant Examiner* — Esayas G Yeshaw
(74) *Attorney, Agent, or Firm* — Michael Best & Friedrich LLP (57) ABSTRACT

The invention relates to a circuit device (100) for reducing common-mode interference of a power converter (60), the power converter (60) forming a common-mode interference source during operation. The circuit device (100) comprises at least one short-circuited additional line (50), which can be coupled to an input (10, 15) and an output (20, 25, 30) of the power converter (60). The additional line (50) conducts the interference currents produced by the common-mode interference source and returns said interference currents to the common-mode interference source.

12 Claims, 5 Drawing Sheets

(51) Int. Cl.
  *H02M 7/5387* (2007.01)
  *H02P 27/06* (2006.01)
  *B60L 50/60* (2019.01)
(52) U.S. Cl.
  CPC .............. *H02P 27/06* (2013.01); *B60L 50/60* (2019.02); *B60L 2270/147* (2013.01)

(56) References Cited

U.S. PATENT DOCUMENTS

| | | | | |
|---|---|---|---|---|
| 2019/0123675 | A1* | 4/2019 | Nawa | H02M 7/537 |
| 2019/0342124 | A1* | 11/2019 | Bhagwat | H04L 25/0266 |
| 2020/0321836 | A1* | 10/2020 | Kagawa | H02K 11/02 |
| 2020/0412272 | A1* | 12/2020 | Raimann | H01F 27/28 |
| 2021/0194348 | A1* | 6/2021 | Wang | H02M 3/33576 |

FOREIGN PATENT DOCUMENTS

| | | | | |
|---|---|---|---|---|
| EP | 1085649 | A2 * | 3/2001 | ............. H02M 1/12 |
| EP | 1085649 | A2 | 3/2001 | |
| JP | 2007181341 | A | 7/2007 | |

\* cited by examiner

CIRCUIT DEVICE FOR REDUCING COMMON-MODE INTERFERENCE OF A POWER CONVERTER

BACKGROUND OF THE INVENTION

The invention relates to a circuit device for reducing common-mode interferences of a power converter. The invention furthermore relates to a power electronics system having a corresponding circuit device and an electric vehicle having a power electronics system.

During the operation of voltage transformers, common-mode interferences occur which result in electromagnetic emissions. These should always be minimized during the operation of electrical systems so that these systems do not influence other systems in the surrounding area. Diverse solutions for electromagnetically shielding individual current-carrying lines are known. For example, in this regard, DE102014224267A1 discloses a cable sheath for sheathing an electric line. Alternatively, filter assemblies are known, which consist of capacitors and inductors for minimizing the electromagnetic emission. The known solutions are implemented by means of discrete components which are added to the actual circuit, require installation space and incur additional costs. Attempts to find simpler solutions continue.

SUMMARY OF THE INVENTION

The invention relates to a circuit device for reducing common-mode interferences of a power converter, wherein the power converter forms a common-mode interference source during operation. The circuit device comprises at least one short-circuited additional line, which can be coupled to an input and an output of the power converter. The additional line conducts the interference currents produced by the common-mode interference source and returns them to the common-mode interference source.

A circuit device is therefore provided for reducing common-mode interferences of a power converter, wherein the power converter forms a common-mode interference source during operation. There are various types of power converter. Power converters for converting alternating current into direct current are known as rectifiers. Inverters convert direct current into alternating current. Converters are used for converting one alternating current type into another; for example, a frequency converter serves to alter an alternating current frequency. DC-DC converters convert a first DC voltage into a second DC voltage, which can be higher, lower or inverted. The conversion is generally carried out with the aid of electronic components based on semiconductors—for instance with diodes, transistors or thyristors, in particular by means of MOSFETs, IGBTs and IGCTs. Vacuum tubes, mercury-arc rectifiers and thyratrons were also previously used. In this case, capacitors or inductors are often used in the devices as energy buffers. The power converter is preferably a voltage transformer, DC-DC converter, inverter or current transformer. The power converter is preferably a combination of at least one or more DC-DC converters, inverters and/or power converters connected in series or in parallel. The power converter preferably has a varying number of input and output lines. The power converter furthermore preferably comprises passive components, preferably diodes, or active components, preferably semiconductor switching elements. The circuit device comprises at least one short-circuited additional line, which can be coupled to an input and an output of the power convertor. A short-circuited additional line is preferably a ring line in which a current, in particular the interference current produced by the common-mode interference source, can be conducted in the circuit. Within the context of these embodiments, "can be coupled" means that the additional line is preferably connected inductively, for example by means of a common choke, capacitively or galvanically to the input and the output of the power converter. The input of a power converter preferably comprises a first and a second input line. The output of a power converter preferably comprises a plurality of output lines on the output side. The power converter is preferably an inverter. The input of an inverter preferably comprises a first and a second DC voltage line as input lines. On the AC voltage side, the output of an inverter preferably comprises a plurality of phases or phase lines, preferably three phases, as output lines on the output side, for example for supplying an electric machine. By means of the coupling, the short-circuited additional line conducts the interference currents produced by the common-mode interference source and returns them to the common-mode interference source. During the operation of the power converter, the common-mode interference source is produced in particular within the power converter, in particular as a result of switching procedures of the semiconductor switch, by means of which an input voltage is preferably converted into an output voltage by means of one or more half bridges by opening and closing the switches of the at least one half bridge in a synchronized manner. During the operation of an inverter, the common-mode interference source is produced in particular within the inverter, wherein an input DC voltage is preferably converted into a multi-phase output AC voltage by means of a B6 bridge by opening and closing the switches of the B6 bridge in a synchronized manner. A circuit device is advantageously provided, which picks up the resulting interference currents and therefore reduces the electromagnetic emission of the power converter.

In another configuration of the invention, the circuit device comprises a first common-mode choke, through which the additional line is routed. The additional line is preferably wound at least once, preferably ten times, around the first common-mode choke. The first common-mode choke is preferably arranged on the input-voltage side of the power converter.

The circuit device comprises a first common-mode choke, through which the additional line is routed. This results in an inductive coupling to lines which are also routed through this common-mode choke. To increase the inductive effect and thereby enhance the inductive coupling, the additional line is wound at least once, preferably ten times, around the first common-mode choke. The first common-mode choke is preferably arranged on the input-voltage side of the power converter. This means that the additional line can be coupled to the input of the power converter. A circuit device with improved coupling is advantageously provided, which picks up the resulting interference currents and therefore reduces the electromagnetic emission of the power converter.

In another configuration of the invention, the circuit device comprises a second common-mode choke, through which the additional line is routed. The additional line is preferably wound at least once, preferably ten times, around the second common-mode choke. The second common-mode choke is preferably arranged on the output-voltage side of the power converter.

The circuit device comprises a second common-mode choke, through which the additional line is routed. This results in an inductive coupling to lines which are also routed through this common-mode choke. To increase the inductive effect and thereby enhance the inductive coupling, the additional line is wound at least once, preferably ten times, around the second common-mode choke. The second common-mode choke is preferably arranged on the output-voltage side of the power converter. This means that the additional line can be coupled to the output of the power converter. A circuit device with improved coupling is advantageously provided, which picks up the resulting interference currents and therefore reduces the electromagnetic emission of the power converter.

In another configuration of the invention, the additional line of the circuit device can be galvanically connected to a reference conductor, or by means of a capacitor or a coil.

The additional line of the circuit device can be galvanically connected to a reference conductor. Within the scope of these embodiments, a reference conductor is understood to be a line to which a ground connection of a power connector is connected. The reference conductor is preferably galvanically connected to a protective conductor at only one point. The reference conductor forms the common return conductor of electrical components which are to be connected individually and also conducts current during the operation of the electrical components. The reference conductor is preferably a common ground of an electrical system or a chassis, for example of a vehicle, or the reference conductor is connected to this common ground or the chassis with low impedance. The protective conductor now only conducts a current in the event of a fault, for example in the event of a short circuit between a supply line and a housing of an electrical component, for example the power converter, which is connected to the reference conductor. A concept for increasing the operational safety of the circuit device is advantageously provided.

In another configuration of the invention, the additional line of the circuit device comprises at least one damping component, which minimizes the interference currents in the additional line.

The additional line of the circuit device comprises at least one damping component. A damping component influences the interference current in the additional line. The electric energy of the interference current is preferably converted into thermal energy. A circuit device is advantageously provided, which picks up the resulting interference currents in an enhanced manner and therefore reduces the electromagnetic emission of the power converter.

In another configuration of the invention, the damping component comprises at least one resistor.

A resistor which converts the electric energy of the interference current into thermal energy is used as a damping component. A circuit device is advantageously provided, which picks up the resulting interference currents in an enhanced manner and therefore reduces the electromagnetic emission of the power converter.

In another configuration of the invention, the damping component comprises a separation of the additional line into a first short-circuited additional line having a first resistor and a second short-circuited additional line having a second resistor. The first short-circuited additional line can preferably be capacitively connected to a reference conductor by means of a first capacitor and/or the second short-circuited additional line can preferably be capacitively connected to a reference conductor by means of a second capacitor.

The damping component comprises a separation of the additional line. The interference current is prevented from flowing from the input of the power converter to the output and back within the additional line. The result is, instead, a first short-circuited additional line having a first resistor on the input side and a second short-circuited additional line having a second resistor on the output side. The resistors damp the interference current in the first and second short-circuited additional line. The common-mode currents are therefore damped at the input and at the output of the power converter. The first short-circuited additional line can preferably be capacitively connected to a reference conductor by means of a first capacitor and/or the second short-circuited additional line can preferably be capacitively connected to a reference conductor by means of a second capacitor. A connection by means of a capacitor results in additional high-frequency damping. An alternative circuit device is advantageously provided, which picks up the resulting interference currents and therefore reduces the electromagnetic emission of the power converter.

In another configuration of the invention, the circuit device comprises input-side capacitors and output-side capacitors. The additional line is configured as a short-circuited series connection of the first common-mode choke, a first resistor, the second common-mode choke and a second resistor. The input-side capacitors are arranged between the first resistor and the first common-mode choke for input-side connection to the input lines of the power converter and the output-side capacitors are arranged between the first resistor and the second common-mode choke for output-side connection to the output lines of the power converter. The first resistor is preferably very much larger than the second resistor; the values of the resistors preferably differ by a factor of 10.

The circuit device comprises input-side capacitors and output-side capacitors. Within the context of these embodiments, input-side capacitors are capacitors which can be connected between a respective input line of the power converter and the additional line. Within the context of these embodiments, output-side capacitors are capacitors which can be connected between a respective output line of the power converter and the additional line. The additional line is configured as a short-circuited series connection of the first common-mode choke, a first resistor, the second common-mode choke and a second resistor. The input-side capacitors are arranged between the first resistor and the first common-mode choke for input-side connection to the input lines of the power converter. The output-side capacitors are arranged between the first resistor and the second common-mode choke for output-side connection to the output lines of the power converter. A low-impedance path for the common-mode currents is provided by means of the capacitors. In combination with the common-mode chokes, a filter with an LC or CL topology is preferably produced on the input side and the output side. The first resistor is preferably very much larger than the second resistor; the values of the resistors preferably differ by a factor of 10. Overheating of the input-side and output-side capacitors is therefore prevented. An alternative circuit device is advantageously provided, which picks up the resulting interference currents and therefore reduces the electromagnetic emission of the power converter.

In another configuration of the invention, the circuit device comprises output-side capacitors. The additional line is configured as a short-circuited series connection of the first common-mode choke and a first resistor. The output-side capacitors are arranged between the first resistor and the first common-mode choke for output-side connection to the output lines of the power converter. The additional line can preferably be capacitively connected to a reference conductor by means of a first capacitor. This capacitive additional connection ensures a more broadband effect than the purely inductive connection. An alternative circuit device is advantageously provided, which picks up the resulting interference currents and therefore reduces the electromagnetic emission of the power converter.

The invention furthermore relates to a power electronics system having the power converter and a connected described circuit device.

A power electronics system consisting of the power converter and the connected circuit device is provided. A power electronics system is advantageously provided, in which a reduction in the electromagnetic emission is achieved.

In another configuration of the invention, the power electronics system comprises a connected DC voltage source and/or a connected multi-phase electric machine.

A power electronics system is provided, which comprises a connected DC voltage source, preferably a high-voltage battery, a fuel cell and/or a photovoltaic system, and/or a connected multi-phase electric machine, preferably a synchronous or asynchronous machine. A power electronics system is advantageously provided, in which a reduction in the electromagnetic emission is achieved.

The invention furthermore relates to an electric vehicle having the power electronics system.

An electric vehicle, in particular a motor vehicle, an automobile or truck or a water vehicle or aircraft, is provided with the power electronics system. A vehicle is advantageously provided, in which a reduction in the electromagnetic emission is achieved.

The circuit device or the power electronics system is therefore preferably provided for use in all shielded and unshielded electric and hybrid drive systems in the motor vehicle sector, in 48V motor vehicle drive systems, in industrial drives of all voltage classes, in converter systems in the electric energy supply sector, specifically also in photovoltaic inverters, or in DC-DC converters.

Additionally, the common-mode interference source and the electrical components connected to the power converter, such as an electric energy source or energy sink, can preferably be electromagnetically decoupled by high-impedance components. For an improved filter effect, additional components can preferably also be provided for an alternative low-impedance path for the common-mode currents.

It goes without saying that the features, properties and advantages of the circuit device apply, or can apply, accordingly to the power electronics system or the electric vehicle and vice versa.

BRIEF DESCRIPTION OF THE DRAWINGS

Further features and advantages of embodiments of the invention are revealed in the description below with reference to the accompanying drawings.

The invention will be explained in more detail below with the aid of several figures, which show.

DETAILED DESCRIPTION

Figure 1:
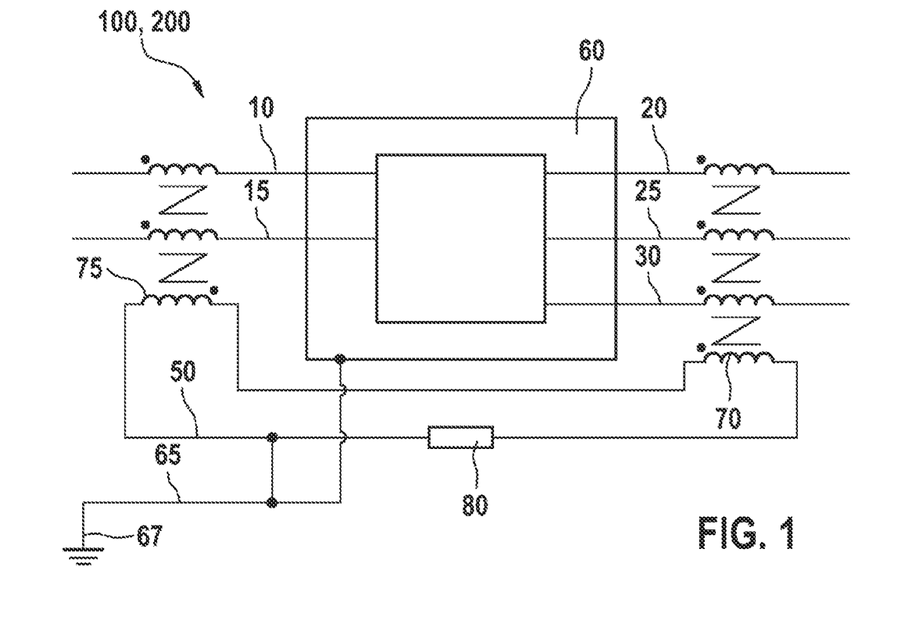
FIG. 1 a first exemplary embodiment in a schematic illustration of a circuit device and a power electronics system.

FIG. 1 shows a first exemplary embodiment in a schematic illustration of a circuit device 100 and a power electronics system 200. The circuit device 100 comprises a short-circuited additional line 50, which can be coupled to an input, preferably by input-side input lines 10, 15, and to an output, preferably by output-side output lines 20, 25, 30, of a power converter 60. The power converter 60, preferably the circuit and/or the housing as a ground connection of the power converter 60, is galvanically connected to a reference conductor 65. To couple the additional line 50 to the input of the power converter 60, the circuit device 100 preferably comprises at least a first common-mode choke 75, through which the input lines 10, 15 and the additional line 50 are routed or wound. For coupling the additional line 50 to the output of the power converter 60, the circuit device 100 furthermore preferably comprises a second common-mode choke 70, through which the output lines 20, 25, 30 and the additional line 50 are routed or wound. During operation, the power converter 60 produces common-mode interferences and forms, in particular, a common-mode voltage source. This common-mode voltage source results in common-mode currents, which are preferably decoupled via the first and second common-mode choke 70, 75 and are transmitted from the common-mode interference source back to the common-mode interference source via the additional line 50. The additional line 50 preferably comprises a damping component 80, in particular a resistor, for damping the common-mode current in the additional line 50. The electric energy of the common-mode current can be converted into thermal energy via the damping element 80, which is, for example, a resistor. The additional line 50 is preferably likewise galvanically connected to the reference conductor 65 for more broadband filtering of high frequencies. The reference conductor 65 is connected or grounded to a protective conductor 67 or ground, or a vehicle ground, at one point. The power converter 60 with the coupled circuit device 100 forms a power electronics system 200.

Figure 2:
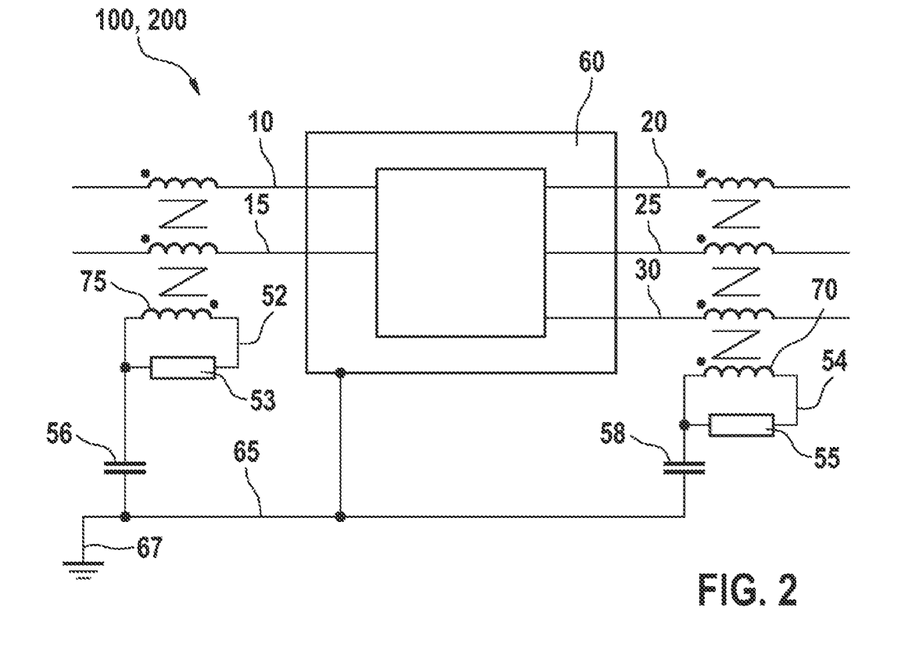
FIG. 2 a second exemplary embodiment in a schematic illustration of a circuit device and a power electronics system.

In contrast to FIG. 1, FIG. 2 shows a second exemplary embodiment in a schematic illustration of a circuit device 100 and a power electronics system 200. The circuit device 100 comprises a particular embodiment of the short-circuited additional line 50 with a maximally defined damping element, namely a separation of the additional line 50. This results in a first short-circuited additional line 52 having a first resistor 53 and a second short-circuited additional line 54 having a second resistor 55. The first additional line 52 can be coupled to the power converter 60 on the input side. The second additional line 54 can be coupled to the power converter 60 on the output side. For coupling the additional line 52, the circuit device 100 preferably comprises at least a first common-mode choke 75, through which the input lines 10, 15 and the additional line 52 are routed or wound. For coupling the additional line 54, the circuit device 100 furthermore preferably comprises a second common-mode choke 70, through which the output lines 20, 25, 30 and the additional line 54 are routed or wound. The first short-circuited additional line 52 can preferably be capacitively connected to the reference conductor 65 by means of a first capacitor 56 and/or the second short-circuited additional line 54 can preferably be capacitively connected to the reference conductor 65 by means of a second capacitor 58. The input and output sides can thus be individually optimized. During operation, the power converter 60 produces common-mode interferences and, in particular, forms a common-mode voltage source. This common-mode voltage source results in common-mode currents, which are decoupled via the first and second common-mode choke 70, 75 and are transmitted from the common-mode interference source back to the common-mode interference source via additional lines 52, 54, preferably via the first and the second capacitor 56, 58 and the reference conductor 65. The additional line 52 and 54 comprise the resistors 53 and 55 as damping components 80 for damping the common-mode current in the additional lines 52, 54. The power converter 60 with the coupled circuit device 100 forms a power electronics system 200.

Figure 3:
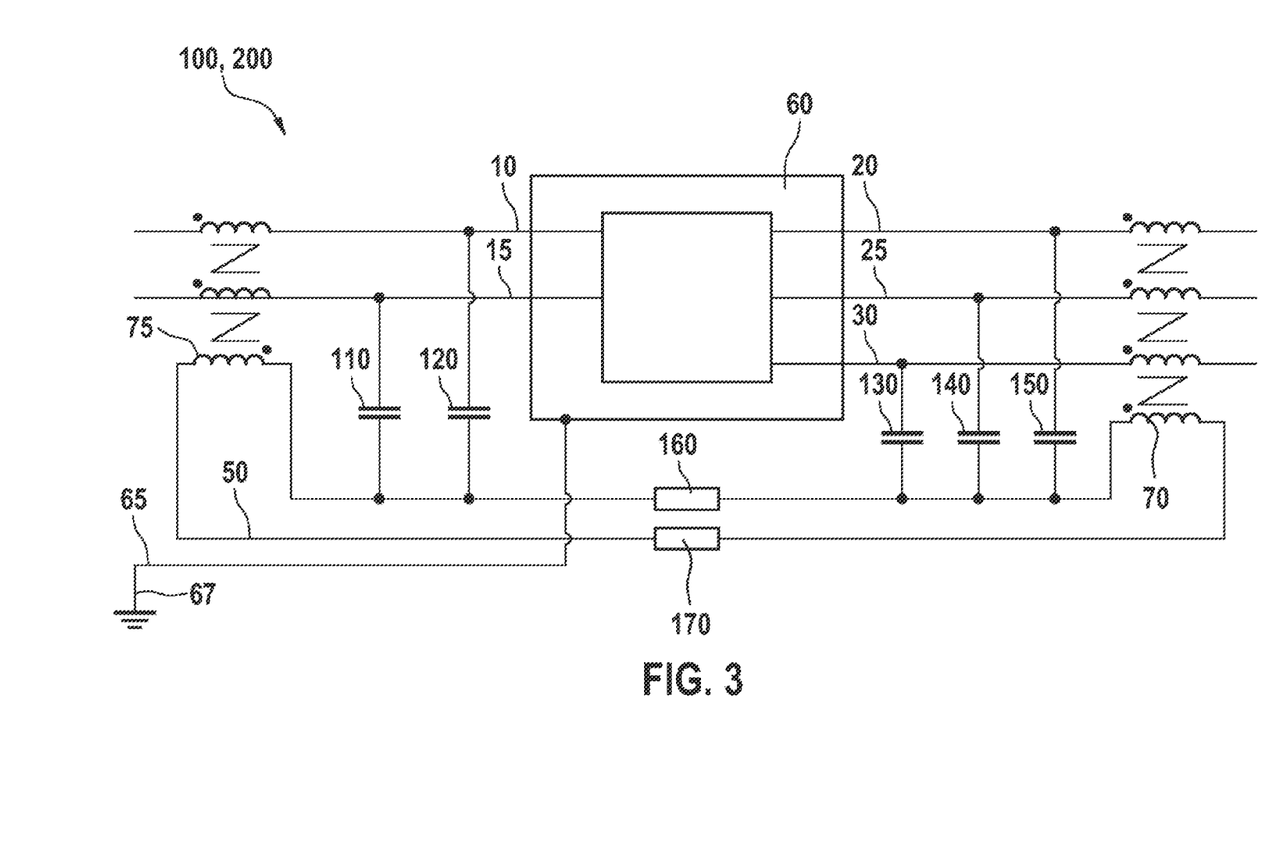
FIG. 3 a third exemplary embodiment in a schematic illustration of a circuit device and a power electronics system.

In contrast to FIG. 1, FIG. 3 shows a third exemplary embodiment in a schematic illustration of a circuit device 100 and a power electronics system 200. The circuit device 100 comprises a short-circuited additional line 50, which can be coupled to an input, preferably by input-side input lines 10, 15, and an output, preferably by output-side output lines 20, 25, 30, of a power converter 60. The circuit device 100 comprises input-side capacitors 110, 120 and output-side capacitors 130, 140, 150. The additional line is configured as a short-circuited series connection of the first common-mode choke 75, a first resistor 160, the second common-mode choke 70 and a second resistor 170. The input-side capacitors 110, 120 are arranged between the first resistor 160 and the first common-mode choke 75 for input-side connection to the input lines of the power converter 60. The output-side capacitors 130, 140, 150 are arranged between the first resistor 160 and the second common-mode choke 70 for output-side connection to the output lines of the power converter 60. The first resistor 160 is preferably very much larger than the second resistor 170. The ratio of the first resistor 160 to the second resistor 170 is preferably approximately 10. During operation, the power convertor 60 produces common-mode interferences and forms, in particular, a common-mode voltage source. This common-mode voltage source results in common-mode currents, which are decoupled via the first and second common-mode choke 70, 75 and the input-side capacitors 110, 120 and output-side capacitors 130, 140, 150 and are transmitted from the common-mode interference source back to the common-mode interference source via the additional line 50. The additional line 50 is preferably not galvanically connected to the reference conductor 65. The reference conductor 65 is connected or grounded to a protective conductor 67 at one point. The power converter 60 with the coupled circuit device 100 forms a power electronics system 200.

Figure 4:
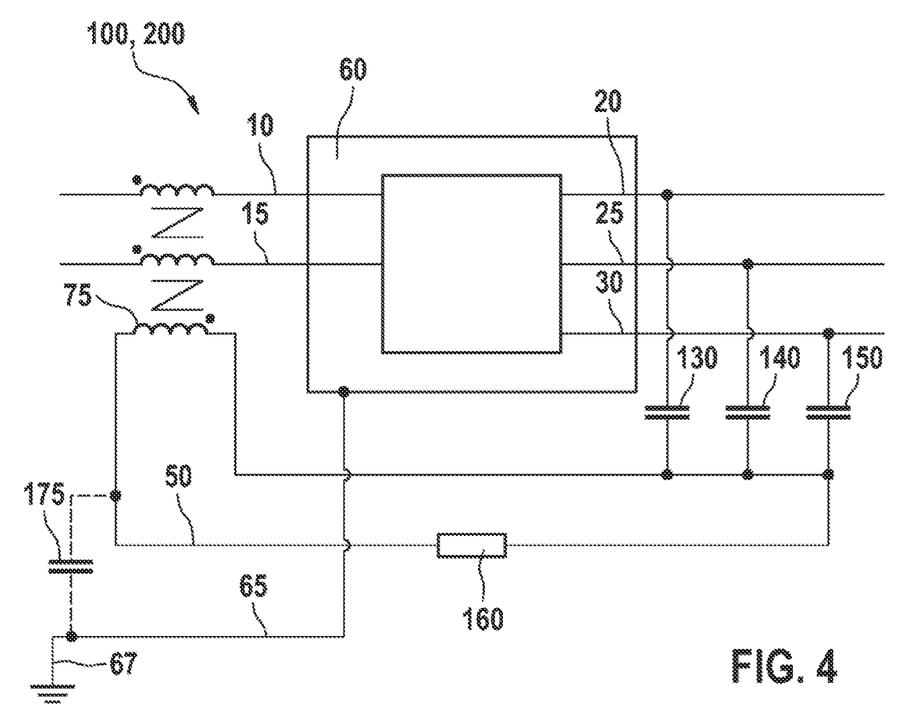
FIG. 4 a fourth exemplary embodiment in a schematic illustration of a circuit device and a power electronics system.

In contrast to FIG. 1, FIG. 4 shows a fourth exemplary embodiment in a schematic illustration of a circuit device 100 and a power electronics system 200. The circuit device 100 comprises a short-circuited additional line 50, which can be coupled to an input, preferably by input-side input lines 10, 15, and an output, preferably by output-side output lines 20, 25, 30, of a power converter 60. The power converter 60, preferably the circuit and/or the housing as a ground connection of the power converter 60, are galvanically connected to a reference conductor 65. For coupling the additional line 50, the circuit device 100 preferably comprises at least a first common-mode choke 75, through which the input lines 10, 15 and the additional line 50 are routed or wound. For coupling the additional line 50, the circuit device 100 furthermore comprises output-side capacitors 130, 140, 150. The additional line 50 is configured as a short-circuited series connection of the first common-mode choke 75 and a first resistor 160. The output-side capacitors 130, 140, 150 are arranged between the first resistor 160 and the first common-mode choke 75 for output-side connection to the output lines of the power converter 60. The additional line 50 can preferably be capacitively connected to a reference conductor 65 by means of a third capacitor 175. This topology has a particularly high power density. During operation, the power converter 60 produces common-mode interferences and forms, in particular, a common-mode voltage source. This common-mode voltage source results in common-mode currents, which are decoupled via the first common-mode choke 75 and the output-side capacitors 130, 140, 150 and are transmitted from the common-mode interference source back to the common-mode interference source via the additional line 50. The additional line 50 preferably comprises a first resistor 160 as a damping component for damping the common-mode current in the additional line 50. The power converter 60 with the coupled circuit device 100 forms a power electronics system 200.

Figure 5:
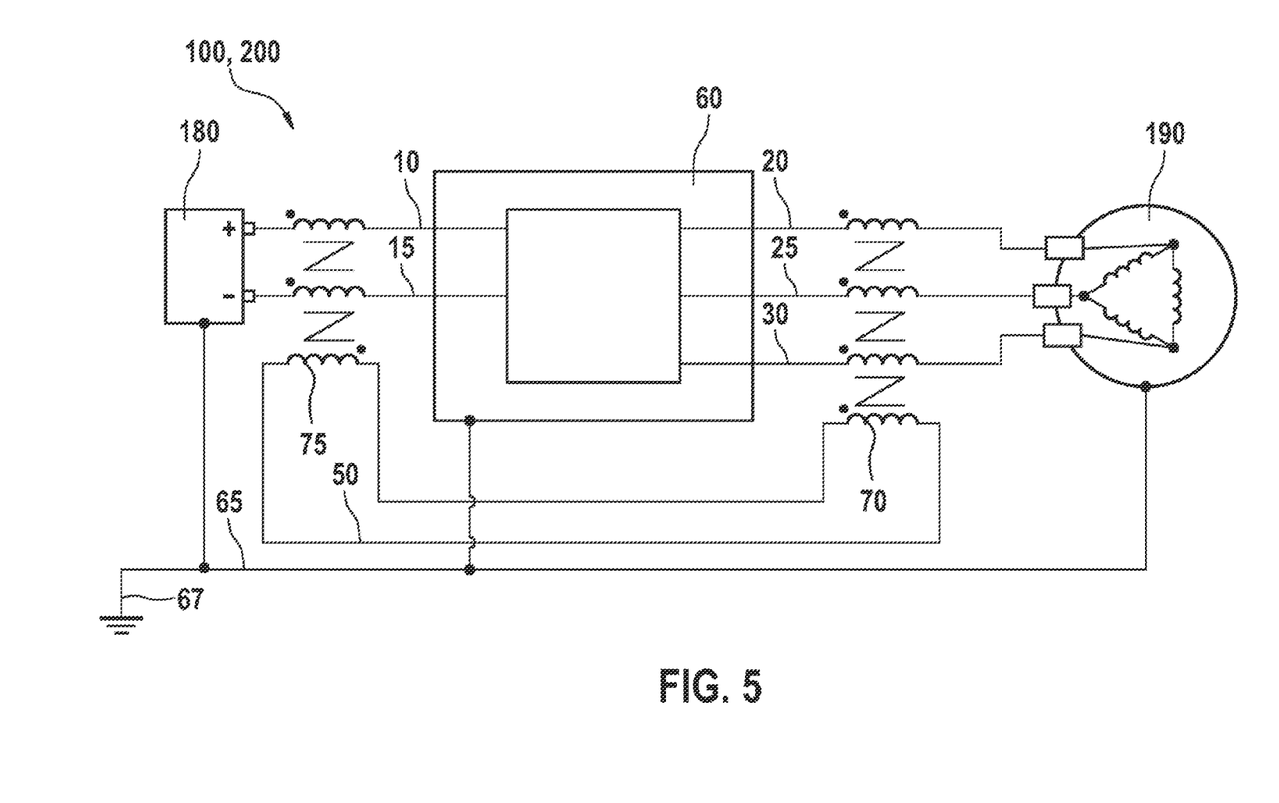
FIG. 5 a fifth exemplary embodiment in a schematic illustration of a circuit device and a power electronics system.

In contrast to the previous figures, FIG. 5 shows a fifth exemplary embodiment in a schematic illustration of a circuit device 100 and a power electronics system 200. The power converter 60 with the coupled circuit device 100 forms a power electronics system 200. The power electronics system 200 furthermore comprises a connected DC voltage source 180 and/or a connected multi-phase electric machine 190. By way of example, the DC voltage source 180 is electrically conductively connected to one of the input lines 10, 15 of the power converter 60 at a plus pole and a minus pole in each case. The electric machine 190 illustrated by way of example is electrically conductively connected to one of the output lines 20, 25, 30 of the power converter 60 at its three phase connections in each case. The power converter 60 is preferably an inverter for converting the DC voltage of the DC voltage source 180, preferably a battery, into a multi-phase AC voltage for supplying an electric, preferably three-phase, machine 190. The power converter 60, the DC voltage source 180 and/or the electric machine 190, preferably the electrical circuits thereof and or the housing thereof as ground connections, are galvanically connected to a reference conductor 65. The reference conductor 65 is connected or grounded to a protective conductor 67 at one point.

Figure 6:
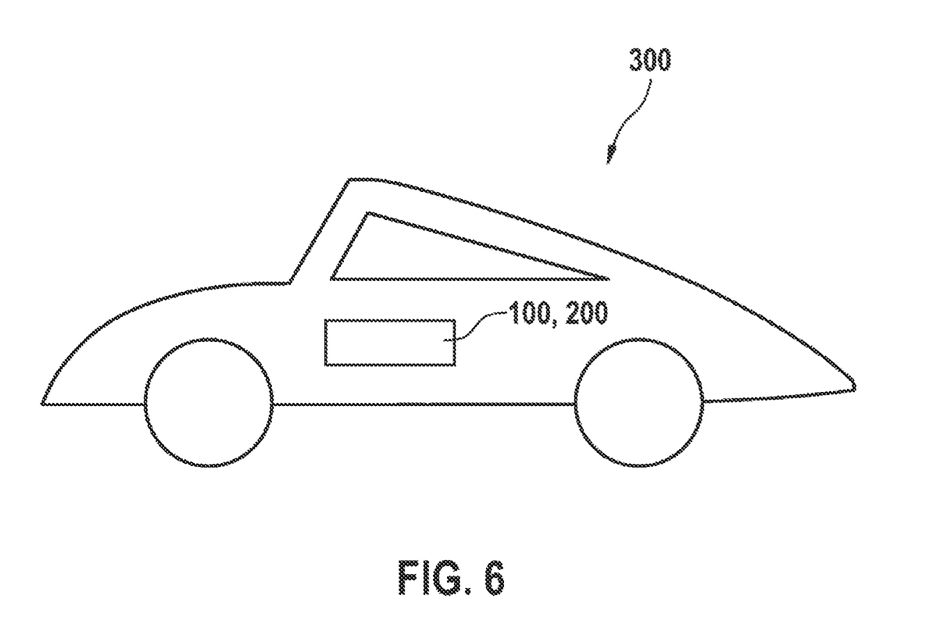
FIG. 6 a sixth exemplary embodiment in a schematic illustration of an electric vehicle having a power electronics system with a circuit device.

FIG. 6 shows a sixth exemplary embodiment in a schematic illustration of an electric vehicle 300 having a power electronics system 200 with a circuit device 100. The electrically driven vehicle 300 is preferably a motor vehicle. It comprises a power electronics system 200 having a circuit device 100 which results in a reduced electromagnetic emission.

The invention claimed is:

1. A circuit device (100) for reducing common-mode interferences of an inverter (60), wherein an input of the inverter includes a first and a second DC voltage line and an output of the inverter includes a plurality of phases or phase lines on an AC voltage side, the inverter (60) forms a common-mode interference source during operation, the circuit device (100)
    having at least one short-circuited additional line (50), which is coupled to an input (10, 15) and an output (20, 25, 30) of the inverter (60), wherein the additional line (50) is a ring line, and conducts the interference currents produced by the common-mode interference source and returns them to the common-mode interference source.

2. The circuit device (100) as claimed in claim 1, wherein the circuit device (100) comprises a first common-mode choke (75), through which the additional line (50) is routed and around which the additional line (50) is wound at least once.

3. The circuit device (100) as claimed in claim 1, wherein
the circuit device (100) comprises a second common-mode choke (70), through which the additional line (50) is routed and around which the additional line (50) is wound at least once.

4. The circuit device (100) as claimed in claim 1, wherein the additional line (50) of the circuit device (100) is configured to be galvanically connected to a reference conductor (65).

5. The circuit device (100) as claimed in claim 1, wherein the additional line (50) of the circuit device (100) comprises at least one damping component (80), which minimizes the interference currents in the additional line (50).

6. The circuit device (100) as claimed in claim 5, wherein the damping component (80) comprises at least one resistor.

7. The circuit device (100) as claimed in claim 5, wherein the damping component (80) comprises a separation of the additional line (50) into a first short-circuited additional line (52) having a first resistor (53) and a second short-circuited line (54) having a second resistor (55),
wherein the first short-circuited additional line (52) is capacitively connected to a reference conductor (65) by means of a first capacitor (56) and the second short-circuited additional line (54) is configured to be capacitively connected to a reference conductor (65) by means of a second capacitor (58).

8. The circuit device (100) as claimed in claim 6, having input-side capacitors (110, 120) and output-side capacitors (130, 140, 150), wherein
the additional line (50) is configured as a short-circuited series connection of the first common-mode choke (75), a first resistor (160), the second common-mode choke (70) and a second resistor (170)
and the input-side capacitors (110, 120) are arranged between the first resistor (160) and the second common-mode choke (75) for input-side connection to the input lines of the inverter (60) and the output-side capacitors (130, 140, 150) are arranged between the first resistor (160) and the second common-mode choke (70) for output-side connection to the output lines of the inverter (60).

9. The circuit device (100) as claimed in claim 2, having output-side capacitors (130, 140, 150), wherein
the additional line (50) is configured as a short-circuited series connection of the first common-mode choke (75) and a first resistor (160) and
the output-side capacitors (130, 140, 150) are arranged between the first resistor (160) and the first common-mode choke (75) for output-side connection to the output lines of the inverter (60),
wherein the additional line (50) is configured to be capacitively connected to a reference conductor (65) by means of a third capacitor (175).

10. A power electronics system (200) having the inverter (60) and a connected circuit device (100) as claimed in claim 1.

11. The power electronics system (200) as claimed in claim 10, having a connected DC voltage source (180), a connected multi-phase electric machine (190), or both.

12. An electric vehicle (300) having a power electronics system (200) as claimed in claim 10.

* * * * *